(12) United States Patent
Gundavelli et al.

(10) Patent No.: US 11,910,491 B2
(45) Date of Patent: Feb. 20, 2024

(54) PROXY MOBILE INTERNET PROTOCOL BASED MOBILITY MANAGEMENT SYSTEM

(71) Applicant: Cisco Technology, Inc., San Jose, CA (US)

(72) Inventors: Srinath Gundavelli, San Jose, CA (US); Sangram Kishore Lakkaraju, Bangalore (IN); Vimal Srivastava, Bangalore (IN); Oliver James Bull, Bristol (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 122 days.

(21) Appl. No.: 17/143,625

(22) Filed: Jan. 7, 2021

(65) Prior Publication Data
US 2022/0217815 A1    Jul. 7, 2022

(51) Int. Cl.
   *H04W 88/16*    (2009.01)
   *H04W 36/14*    (2009.01)
   *H04W 76/12*    (2018.01)
   *H04W 80/04*    (2009.01)

(52) U.S. Cl.
CPC ........... *H04W 88/16* (2013.01); *H04W 36/14* (2013.01); *H04W 76/12* (2018.02); *H04W 80/04* (2013.01)

(58) Field of Classification Search
CPC ..... H04W 88/16; H04W 76/12; H04W 36/14; H04W 80/04
See application file for complete search history.

(56) References Cited

U.S. PATENT DOCUMENTS

| 8,599,865 B2* | 12/2013 | Venkataswami ...... H04W 76/12 709/227 |
| 9,198,209 B2 | 11/2015 | Grayson et al. |
| 9,847,932 B2* | 12/2017 | Gundavelli ........... H04W 76/12 |
| 2010/0215019 A1 | 8/2010 | Velev et al. |
| 2010/0246509 A1 | 9/2010 | Chen |

(Continued)

FOREIGN PATENT DOCUMENTS

| CN | 106465080 A * | 2/2017 | ......... H04L 12/4633 |
| CN | 113194513 A * | 7/2021 | ......... H04L 41/0806 |
| EP | 2876924 A1 * | 5/2015 | ............. H04L 47/32 |

(Continued)

OTHER PUBLICATIONS

Wikipedia, "Proxy Mobile IPV6", https://en.wikipedia.org/wiki/Proxy_Mobile_IPv6#Proxy_Mobile_IPv6, Jan. 4, 2021, 12 pages.

(Continued)

*Primary Examiner* — Saad A. Waqas
(74) *Attorney, Agent, or Firm* — Edell, Shapiro & Finnan, LLC

(57) ABSTRACT

A first data plane is established between a user equipment device and a gateway device, wherein the user equipment device comprises a 3rd Generation Partnership Project (3GPP) user equipment device, and wherein the first data plane comprises a 3GPP data plane. A second data plane is established between the gateway device and an anchor device, wherein the second data plane comprises a Proxy Mobile Internet Protocol version 6 (PMIPv6) data plane. Mobility management is performed for the user equipment device via communications between the gateway device and the anchor device.

20 Claims, 11 Drawing Sheets

(56) References Cited

U.S. PATENT DOCUMENTS

2018/0309501 A1  10/2018  Fang

FOREIGN PATENT DOCUMENTS

| EP | 2687047 B1 | * | 11/2018 | ............ | H04W 24/04 |
| WO | WO-2014000304 A1 | * | 1/2014 | ............ | H04W 24/04 |
| WO | WO-2018044261 A1 | * | 3/2018 | ............ | H04L 45/66 |

OTHER PUBLICATIONS

S. Gundavelli, Ed et al., "Proxy Mobile IPV6", Network Working Group, Request for Comments: 5213, Category: Standards Track, Aug. 2008, 92 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.9.0, Dec. 2020, 440 pages.
3GPP, "3rd Generation Partnership Project; Technical Specification Group Services and System Aspects; Architecture enhancements for non-3GPP accesses (Release 16)", 3GPP TS 23.402 V16.0.0, Jun. 2019, 314 pages.
3GPP, "3rd Generation Partnership Project; Technical Specification Group Core Network and Terminals; Proxy Mobile IPv6 (PMIPv6) based Mobility and Tunnelling protocols; Stage 3 (Release 16)", 3GPP TS 29.275 V16.0.0, Jul. 2020, 102 pages.
Gohar, Moneeb et al., "Enhanced Mobility Management Scheme in PMIP-SAE based Mobile Networks", IEEE Communications Letters, vol. XX, No. Y, Mar. 2016, 4 pages.
F. Xia et al., "Radius Support for Proxy Mobile IPV6", Internet Engineering Task Force (IETF), Request for Comments: 6572, Category: Standards Track, ISSN: 2070-1721, Jun. 2012, 36 pages.
R. Wakikawa et al., "IPv4 Support for Proxy Mobile IPv6", Internet Engineering Task Force (IETF), Request for Comments: 5844, Category: Standards Track, ISSN: 2070-1721, May 2010, 49 pages.

* cited by examiner

… (1)

PROXY MOBILE INTERNET PROTOCOL BASED MOBILITY MANAGEMENT SYSTEM

TECHNICAL FIELD

The present disclosure relates to providing mobility management for wireless communication devices.

BACKGROUND

Private Long Term Evolution (LTE) and Fifth Generation Mobile Network (5G) networks require the same back-end service core as public LTE/5G access. An enterprise deploying a private LTE/5G network will need to host and manage all the complex 3rd Generation Partnership Project (3GPP) radio and Evolved Packet Core (EPC) functions. In 5G implementations, these functions may include the Packet Data Network Gateway (PGW), the Serving Gateway (SGW), the Mobility Management Entity (MME), the Policy and Charging Rules Function (PCRF), and the Home Subscriber Server (HSS) function. These functions were designed for a service-oriented architecture, not for enterprise wireless service. Many of the features of these EPC/5G functions have no relation or use in the enterprise context. There are also many other legacy features which again have no use in enterprise Private LTE deployments.

DESCRIPTION OF EXAMPLE EMBODIMENTS

Overview

Example embodiments of the techniques described in the present disclosure provide for a PMIPv6 mobility management system. According to specific example embodiments, the techniques described herein may provide for a Non-Access Stratum (NAS) Signaling termination on radio access nodes, such as Long-Term Evolution (LTE) eNodeBs (eNBs) or fifth generation (5G) technology standard for broadband cellular networks Next Generation Node Bs (gNBs), for interworking with a Proxy Mobile Internet Protocol version 6 (PMIPv6) mobility management system.

According to specific example embodiments, a first data plane is established between a user equipment device and a gateway device, wherein the user equipment device comprises a 3rd Generation Partnership Project (3GPP) user equipment device, and wherein the first data plane comprises a 3GPP data plane. A second data plane is established between the gateway device and an anchor device, wherein the second data plane comprises a Proxy Mobile Internet Protocol version 6 (PMIPv6) data plane. Mobility management is performed for the user equipment device via communications between the gateway device and the anchor device.

According to another specific example embodiment, a first protocol stack is provided at a gateway device, wherein the first protocol stack comprises a 3rd Generation Partnership Project (3GPP) protocol stack configured to wirelessly communicate with a user equipment device. A second protocol stack is provided at the gateway device, wherein the second protocol stack comprises a Proxy Mobile Internet Protocol version 6 (PMIPv6) protocol stack configured to communicate with an anchor device. A message is obtained at the gateway device from a first one of the user equipment device or the anchor device. The message from one of the first protocol stack or the second protocol stack is mapped to another of the first protocol stack or the second protocol stack. The message is provided via the another one of the first protocol stack or the second protocol stack to a second one of the user equipment or the anchor device.

Example Embodiments

Figure 1:
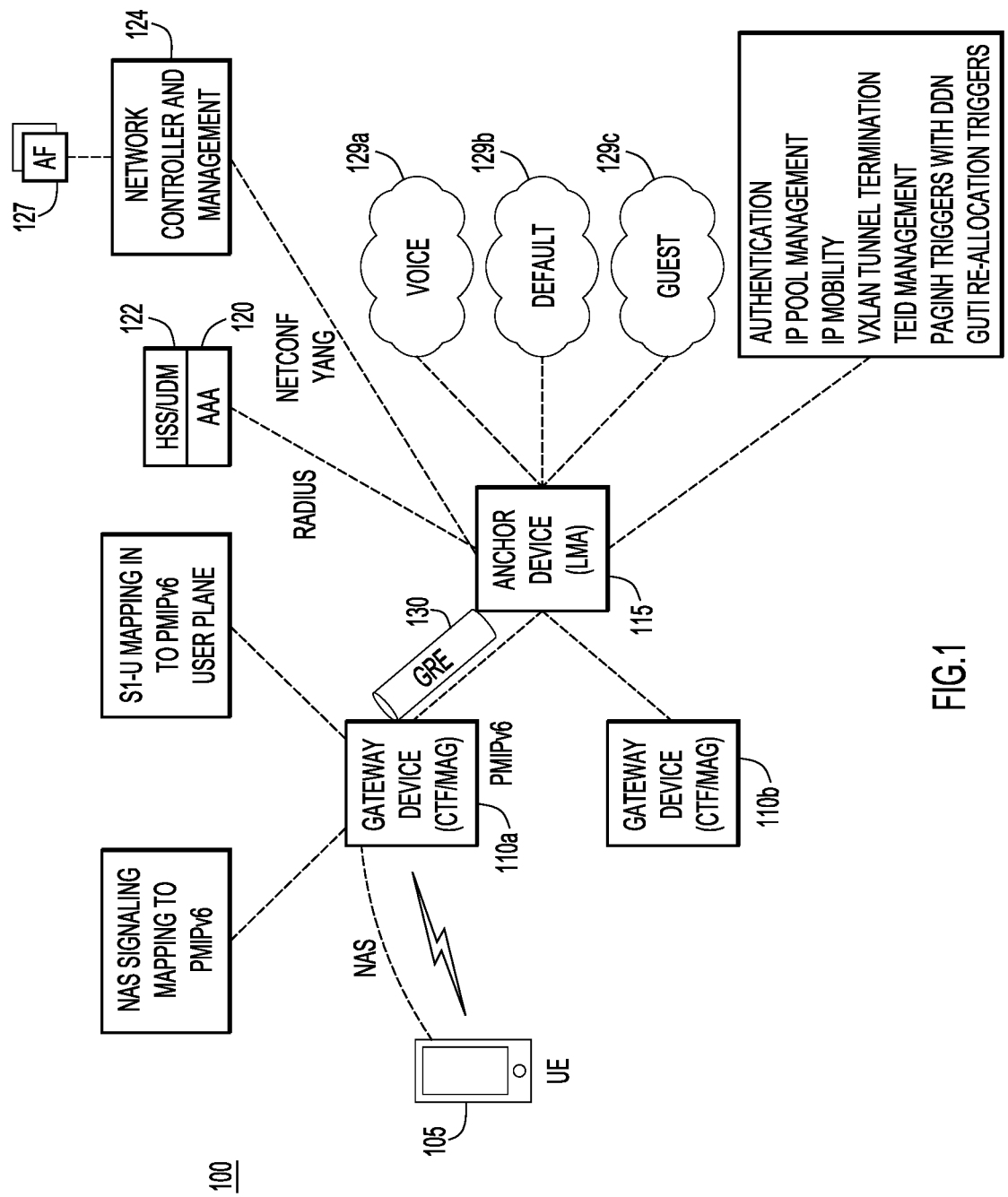
FIG. 1 is a network environment configured to provide a Proxy Mobile Internet Protocol version 6 (PMIPv6) mobility management system, according to an example embodiment.

With reference now made to FIG. 1, depicted therein is a network environment 100, configured according to the techniques of the present disclosure. Included in network environment 100 are user equipment device 105 that is configured to wirelessly communicate with gateway devices 110*a* and 110*b*. The gateway devices 110*a* and 110*b* communicate, in turn, with anchor device 115. Anchor device 115 provides communication between the gateway devices 110*a* and 110*b* and a number of different services, including Authentication Authorization and Accounting (AAA) server 120, a Home Subscriber Server (HSS)/Unified Data Management (UDM) server 122, network controller and management server 124 (which provides services with one or more Application Functions (AF) 127), and Internet Protocol networks and services 129*a-c*. Although not illustrated in FIG. 1, UDM server 122 may interface or be combined with a Unified Data Repository (UDR).

According to the example embodiment of network environment 100, user equipment device 105 is configured to communicate according to Long-Term Evolution (LTE) and/or fifth generation (5G) wireless wide area/cellular Radio Access Technology (RAT) types of the 3rd Generation Partnership Project (3GPP), examples of which are included the in the TS36 and TS38 series of specifications. Although LTE/5G technologies are discussed herein, it is to be understood that embodiments herein may be equally applicable to any wireless wide area/cellular access technology types, such as 3GPP next Generation (nG) technologies, including sixth generation (6G), etc. Gateway devices 110a and 110b communicate with user equipment device 105 according to the LTE and/or the 5G standards, but with anchor device 115 according to the Proxy Mobile Internet Protocol version 6 (PMIPv6) protocol. Anchor device 115 also communicates with AAA server 120 (e.g., via the Remote Authentication Dial-In User Service (RADIUS) protocol), HSS/UDM server 122 (e.g., via the RADIUS protocol), network controller and management server 124 (e.g., via the Network Configuration (NETCONF)/Yet Another Next Generation (YANG) protocols) and facilitates communications between user equipment device 105 and services 129a-c. Accordingly, the example embodiment of network environment 100 is configured to provide interworking between an LTE/5G Signaling/User plane and a PMIPv6 mobility management system.

PMIPv6 is a protocol for building a common and access-technology agnostic mobility core. A key capability of PMIPv6 is its ability to provide mobility management support to a mobile node without requiring its participation in any Internet Protocol (IP) mobility-related signaling. The mobility entities in the network may track the mobile node's movements and may initiate the mobility signaling and set up the routing state in the network. The core functional entities in the PMIPv6 domain are the Local Mobility Anchor (LMA) and the Mobile Access Gateway (MAG). The MAG is responsible for maintaining the mobile node's reachability state and it is the topological anchor point for the mobile node's home network. All the mobile node's inbound and outbound IP traffic may be routed through the LMA. The MAG is the entity that performs the mobility management on behalf of the mobile node, and it resides on the access link where the mobile node is anchored. The MAG is responsible for detecting the mobile node's movements in the network, and for initiating binding registrations to the LMA. The base protocol PMIPv6 is specified in Internet Engineering Task Force (IETF) Requests for Comments (RFCs) RFC 5213, and RFC 5844.

According to the techniques of the present disclosure, gateway devices 110a and 110b are configured to serve as LTE Evolved Node Bs (eNBs or eNodeBs) (also referred to as an E-UTRAN Node B) or 5G Next Generation Node Bs (gNBs) to communicate with user equipment device 105, while serving as PMIPv6 MAGs when communicating with anchor device 115. Anchor device 115 is configured to serve as an LMA. According to the techniques disclosed herein, minimal extensions to the PMIPv6 wire protocol and/or to the LMA and MAG operational behavior are implemented to facilitate interworking between an LTE/5G Signaling/User plane and a PMIPv6 mobility management system. For clarity, it is noted that the LTE Mobility Management Entity (MME) and/or the 5G Access and Mobility Management Function (AMF) functions are not masked under the name "LMA", or "MAG", but rather these functions may be completely eliminated in example embodiments of network environment 100. Minimal capabilities needed from the MME and/or the AMF are realized by extending the PMIPv6 protocol.

Furthermore, the PMIPv6 protocol need not be modified by scoping-in functions that may be out of scope for a mobility management protocol. Instead, and according to the techniques illustrated in FIG. 1, the PMIPv6 MAG function is collocated with the LTE eNB or 5G gNB. The MAG interfaces with the LMA based on PMIPv6 signaling messages, and there is a PMIPv6-based user plane Generic Routing Encapsulation (GRE) tunnel 130 between the LMA (i.e., anchor device 115) and the MAGs (gateway devices 110a and 110b).

The techniques illustrated in network environment 100 may include the following aspects.

A Cellular Termination Function (CTF) of the eNB/gNB, which terminates Non-Access Stratum (NAS) Signaling messages from the user equipment devices, may be implemented into gateway devices 110a and 110b according to the techniques of the present disclosure. This function has interworking with the PMIPv6 MAG function on the eNB/gNB. Essentially, the user equipment devices Attach/Detach/Paging and other events will be mapped to the MAG-mobile node (MN) interface (i.e., the interface between the MAG, embodied in gateway devices 110a and 110b of FIG. 1, and the mobile nodes, the user equipment device 105 of FIG. 1), which in turn will drive the MAG state machine.

The LTE S1-U/5G N3 user plane interface (which utilizes the General Packet Radio Service (GPRS) tunneling protocol (GTP) in the GTP user plane (GTP-U)) is mapped to the PMIPv6 GRE user plane, with 1:1 mapping between the GTP Tunnel Endpoint Identifier (TED) used in the S1/N1 user plane interface and the GRE Key used in the PMIPv6 user plane GRE tunnel 130.

Thus, a 3GPP MME and/or AMF may be eliminated. The minimal functions that are needed from an MME and/or AMF are absorbed into the eNB/gNB (implemented in gateway devices 110a and 110b) in the form of the CTF, and a few other functions, such as Authentication and Paging functions, are absorbed into the LMA (implemented in anchor device 115).

The techniques used to implement the example embodiment of network environment 100 may include minor extensions to PMIPv6 signaling in the form of new information elements exchanged between the MAGs of gateway devices 110a and 110b and the LMA of anchor device 115, as will be described in greater detail below with reference to FIGS. 3A-3C, 4A, 4B and 5. According to specific example embodiments, these extensions may be realized by using the Vendor Specific Extensions of the PMIPv6 signaling messages, such as the Vendor Specific Extensions that may be included in the Proxy Binding Update (PBU) and the Proxy Binding Acknowledgement (PBA) PMIPv6 signaling messages.

The LMA of a PMIPv6 system (which is implemented in anchor device 115) supports AAA interfaces. The AAA server 120 of FIG. 1 may be configured to support Evolved Packet System Authentication and Key Agreement (EPS-AKA) protocol/methods and RADIUS protocol based interworking with the LMA of anchor device 115. In other example embodiments, the LMA of anchor device 115 may be configured to support the standard 3GPP S6a interface (i.e., the interface between the MME and the HSS server, such as the HSS of HSS/UDM server 122) and will interface with the HSS/UDM server 122 for obtaining the user equipment authentication vectors (AVs) needed for generating the Key Access Security Management Entries (KASME) in LTE environments and the Authentication Management Field (AMF) key ($K_{AMF}$) in 5G environments, among other session keys. The LMA of anchor device 115 may also be configured to support the other standard 3GPP interfaces, such as the N8 interface used to interface with a UDM, such as the UDM of HSS/UDM server 122.

In the PMIPv6 architecture, the MAG periodically performs user equipment on-link determination tests by sending probe messages. In the example embodiment of network environment 100, periodic Tracking Area Update (TAU)

messages sent from user equipment device 105 allow the MAG of gateway devices 110a and 110b to send re-registration PBU messages with a Handoff Indicator value set to "Idle Mode" to achieve similar functionality.

Figure 2:
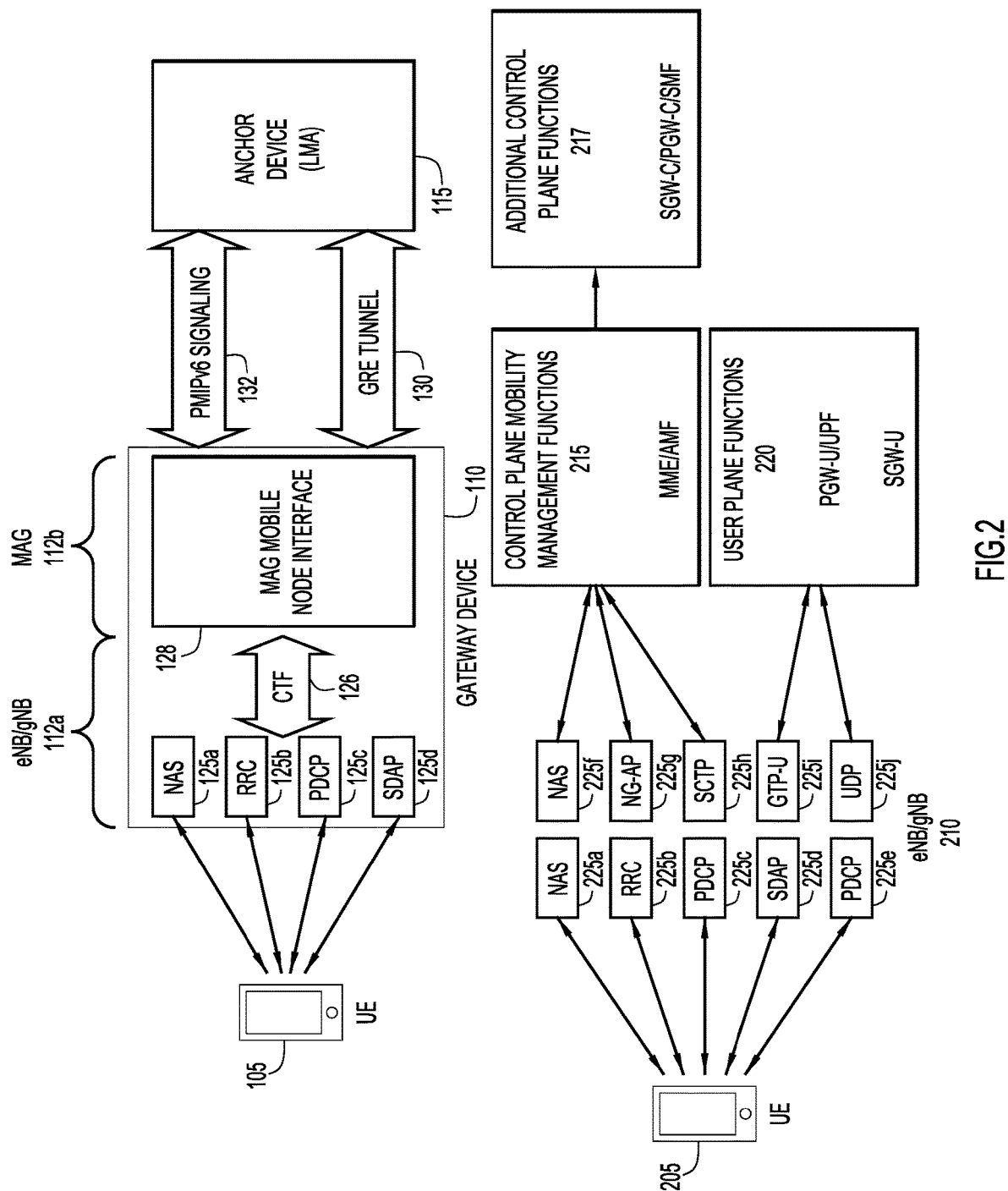
FIG. 2 is a functional illustration of a device configured according to an example embodiment the PMIPv6 mobility management system techniques of the present disclosure, according to an example embodiment, compared with a related art device configured according to 3rd Generation Partnership Project techniques.

With reference now made to FIG. 2, depicted therein is a functional view of a user equipment device 105, a gateway device 110 and an anchor device 115 configured to implement the techniques of the present disclosure, according to an example embodiment. Also illustrated in FIG. 2 are an LTE/5G user equipment device 205, an eNB/gNB device 210, control plane mobility management functions 215, additional control plane functions 217 and user plane functions 220. In LTE environments, the control plane mobility management functions 215 may include an MME device, and the additional control plane functions 217 may include a Serving Gateway Control Plane Function (SGW-C) and a Packet Data Network Gateway Control Plane Function (PGW-U). In 5G environments, the control plane mobility management functions 215 may include an AMF device, and the additional control plane functions 217 may include a Session Management Function (SMF) device. In LTE environments, the user plane functions 220 may include a Packet Data Network Gateway User Plane Function (PGW-U) and/or a Serving Gateway User Plane Function (SGW-U). In 5G environments, the user plane functions 220 may include User Plane Functions (UPFs).

As can be seen through a comparison of these elements, the functionality of the control plane mobility management functions 215 (i.e., the MME or the AMF device) may be eliminated in environments that implement gateway device 110 and anchor device 115 according to the techniques of the present disclosure. Similarly, the functionality of additional control plane functions 217, and the SGW-C, PGW-U and the SMF in particular, may be eliminated in environments that implement gateway device 110 and anchor device 115 according to the techniques of the present disclosure. Specifically, collocated within gateway device 110 are an eNB/gNB 112a that is configured to communicate with user equipment device 105 via a Cellular Termination Function (CTF) 126 that facilitates various LTE/5G functionality via protocols 125a-d. For example, illustrated in gateway device 110 are the Non-Access Stratum (NAS) protocol 125a and the Radio Resource Control (RRC) protocol 125b that are used in the control plane of LTE and 5G environments. Also illustrated in gateway device 110 is the Packet Data Convergence Protocol (PDCP) 125c that is used in the control and user planes of LTE and 5G environments and the Service Data Application Protocol (SDAP) 125d that is used in the user plane of 5G environments. The skilled artisan will understand that these protocols are simply exemplary and additional or alternative protocols may be used in LTE and 5G environments.

The communications received by the CTF 126 via protocols 125a-d are mapped by the CTF 126 to the MAG Mobile Node (MN) Interface 128. PMIPv6 protocols are then used to transmit messages to anchor device 115 using GRE tunnel 130 or PMIPv6 signaling 132 for user plane and control plane data, respectively. CTF 126 may include mapping logic that facilitates the translation of the LTE/5G protocols 125a-d to data that the MAG MN interface 128 is configured to receive. For example, gateway device 110 receives NAS signaling from user equipment device 105 via NAS protocol 125a. CTF 126 maps data associated with this signaling to a form appropriate for receipt by MAG MN interface 128. MAG 112b provides mobility management and session management in response to the signaling through communications with anchor device 115 using the PMIPv6 signaling 132. In other words, NAS signaling terminates at CTF 126 and the PMIPv6 protocol takes over from CTF 126.

For completeness, it is noted that the techniques of the present disclosure are applicable to the 3GPP family of standards, and CTF 126 may be configured appropriately depending on the type of user equipment device 105 (LTE or 5G, for example) that is communicating with the gateway devices 110a and 110b. For example, CTF 126 may be configured to receive NAS signaling from LTE user equipment and may be configured to use an N1 interface for NAS signaling from 5G user equipment. CTF 126 may be configured to map one or both of LTE and 5G NAS signaling to MAG MN interface 128.

Additionally, control and user plane messages received using protocols 125b-c may be similarly mapped by the eNB/gNB 112a (via CTF 126) to the MAG 112b and transmitted using the PMIPv6 protocol and GRE tunnel 130, as appropriate.

In comparison to a 3GPP standards-based implementation as shown via user equipment device 205 and a conventional eNB/gNB device 210, user equipment device 205 communicates with eNB/gNB device 210 using LTE and/or 5G control plane protocols 225a-c and user plane protocols 225d and 225e. For example, illustrated in eNB/gNB device 210 are the NAS protocol 225a, the RRC protocol 225b and the PDCP protocol 225c that are used in the control plane of LTE and 5G environments. Also illustrated in eNB/gNB device 210 are the PDCP protocol 225e that is used in the user plane of LTE and 5G environments and the SDAP protocol 225d that is used in the user plane of 5G environments. The skilled artisan will understand that these protocols are simply exemplary and additional or alternative protocols may be used in LTE and 5G environments. The eNB/gNB device 210 relies on the control plane mobility management functions 215 for mobility management/session management, communicating with control plane mobility management functions 215 using control plane protocols 225f-h, which include the NAS protocol 225f, the NG Application Protocol (NG-AP) 225g and the Stream Control Transmission Protocol (SCTP) 225h. The eNB/gNB device 210 also communicates with user plane functions 220 using user plane protocols 225i and 225j, which include the General Packet Radio Service Tunneling Protocol (GTP-U) 225i and the User Datagram Protocol (UDP) 225j. The skilled artisan will understand that these protocols are simply exemplary and additional or alternative protocols may be used in LTE environments. Similarly, the skilled artisan will understand that the same or different protocols may be used in LTE and 5G environments.

By comparing user equipment device 105, gateway device 110 and anchor device 115, which implement the PMIPv6 mobility management techniques of the present disclosure, with the related art user equipment device 205, eNB/gNB device 210, the control plane mobility management functions 215, additional control plane functions 217 and user plane functions 220, it is apparent that the techniques of the present disclosure eliminate the need for an MME/AMF, as well as other control plane functions, such as an SMF.

In summary, in LTE environments, NAS signaling may be handled via a gateway device 110 that implements an eNB in conjunction with a MAG. Similarly, NAS signaling security may be provided for via a gateway device 110 that implements an eNB in conjunction with a MAG. Also according to the techniques of the present disclosure, PGW-U and PGW-C functionality may be handled through a gateway device 110 that implements an eNB in conjunction with a MAG. As also described above, Authentication, Authorization and Security may be handled through a gateway device 110 that implements an eNB in conjunction with a MAG and an anchor device 115 that implements an LMA. Bearer management functions, including dedicated bearer establishment, may be handled through a gateway device 110 that implements an eNB in conjunction with a MAG and an anchor device 115 that implements an LMA. Finally, context management procedures may be handled through a gateway device 110 that implements an eNB in conjunction with a MAG.

In 5G environments, mobility management may be handled by a gateway device 110 that implements a gNB in conjunction with a MAG. Security and authentication may be handled by an anchor device 115 that implements an LMA. The session management may be handled by an anchor device 115 that implements an LMA. Finally, user plane functions may be handled by an anchor device 115 that implements an LMA.

Figure 3A:
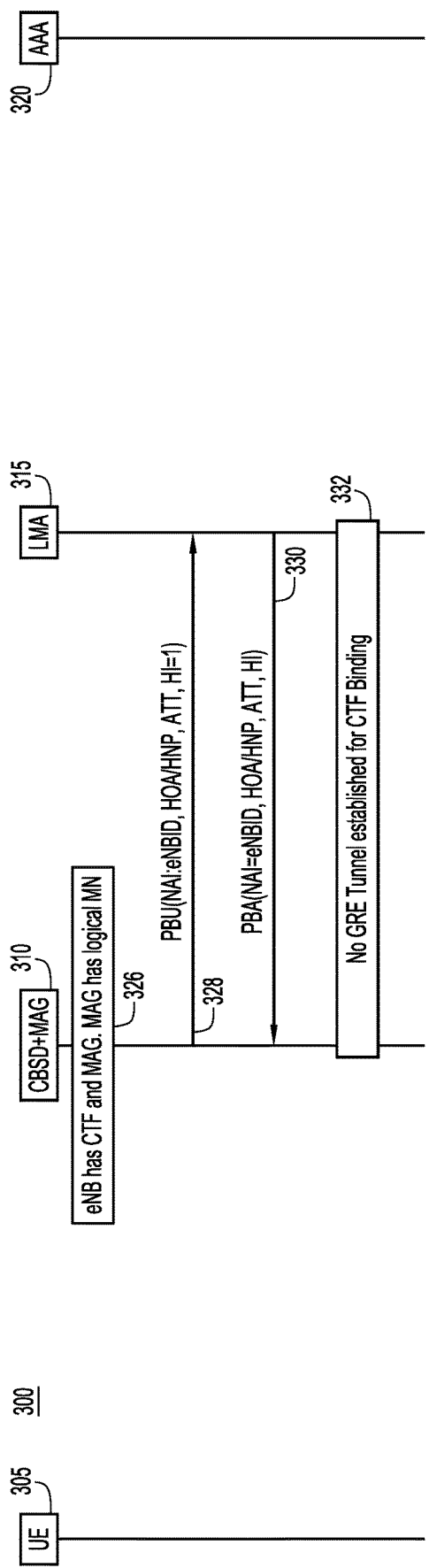
FIGS. 3A, 3B and 3C illustrate a first call flow diagram for an implementation of attach and detach operations of the PMIPv6 mobility management system techniques of the present disclosure, according to an example embodiment.
Figure 3B:
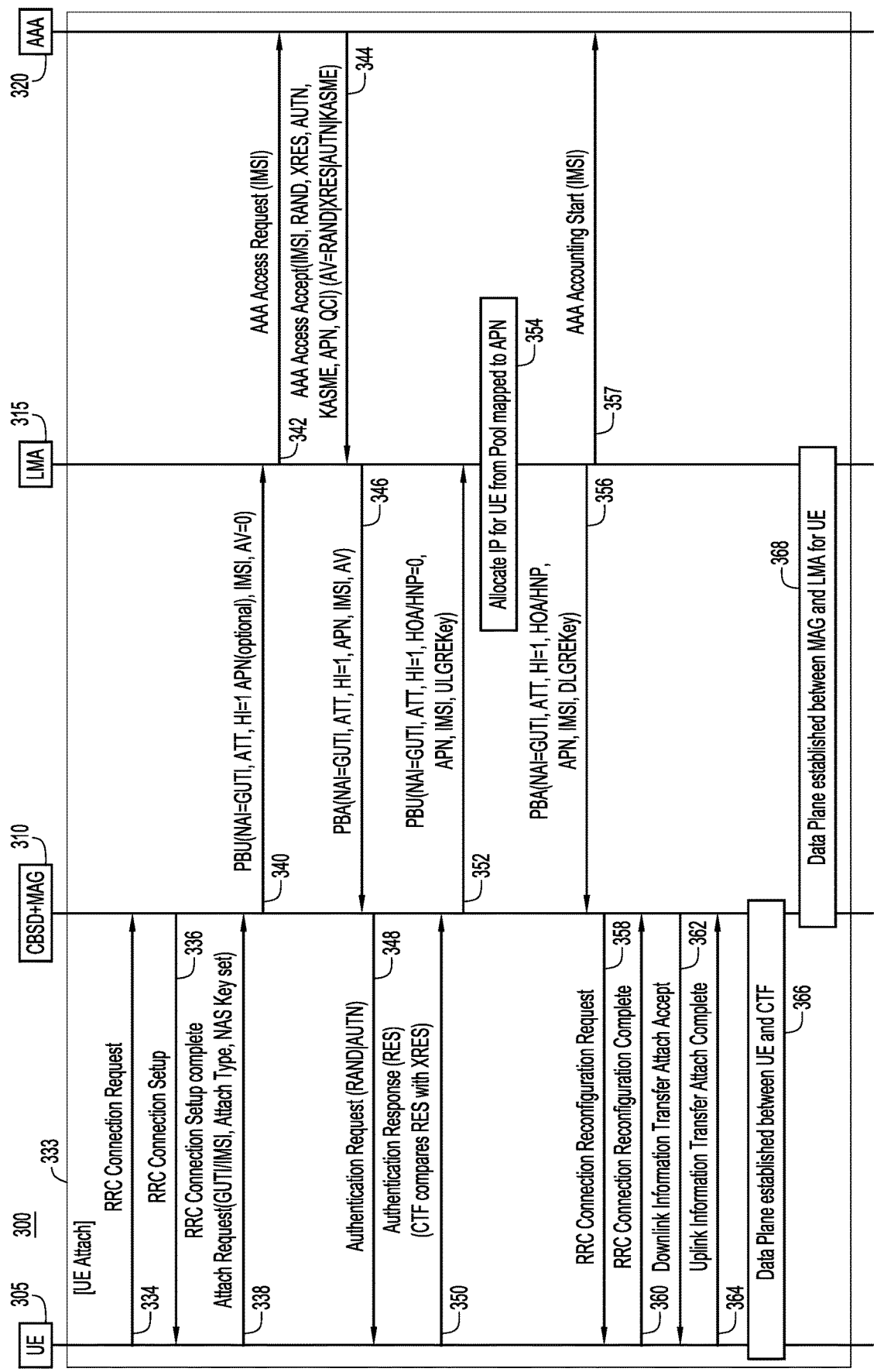
Figure 3C:
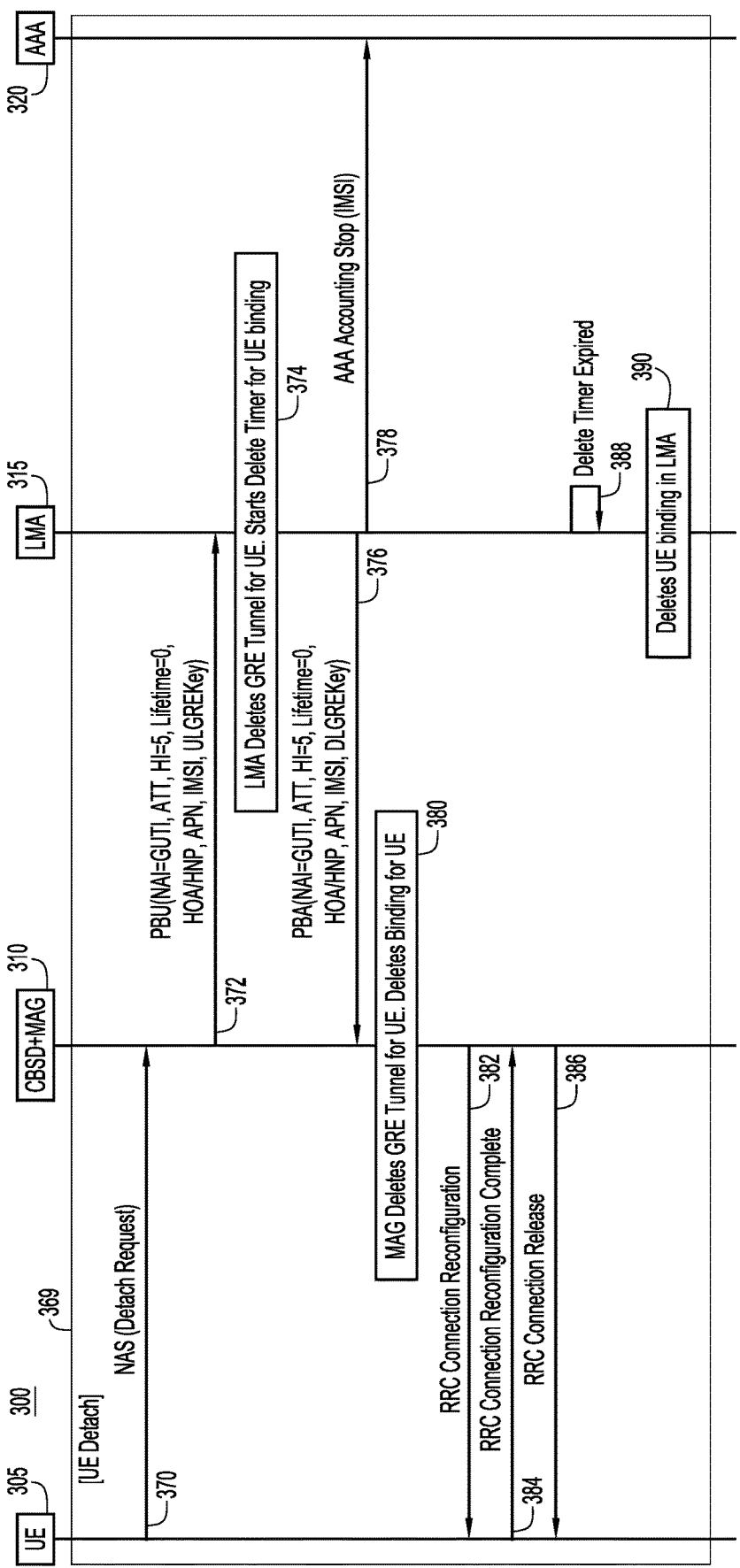

With reference now made to FIGS. 3A-3C, depicted therein is a call flow diagram illustrating a call flow 300 for providing user equipment attach and detach functionality according to the techniques of the present disclosure. Illustrated in FIGS. 3A-3C are messages exchanged between user equipment device 305, a gateway device 310 embodied as combination of an eNB or gNB combined with a MAG, and more particularly a Citizens Broadband Radio Service Device (CBSD), including a CTF/MAG, an anchor device 315 embodied as an LMA, and an AAA server 320.

In operation 326 the CBSD of the gateway device 310 registers with the MAG of the gateway device 310 as a logical Mobile Node (MN). The Logical MN is a virtual MN hosted in the MAG of gateway device 310. PBU message 328 and PBA message 330 form a binding for the CBSD between the MAG of gateway device 310 and the LMA of anchor device 315, but no data plane is enabled for this binding. More specifically, a GRE tunnel has not yet been established for this binding as noted in operation 332.

The CBSD of gateway device 310 manages the Globally Unique Temporary Identifier (GUTI) allocation for user equipment device 305. GUTI reallocation triggers are managed and sent from the LMA of anchor device 315.

A user equipment attach procedure 333 begins when the CBSD of gateway device 310 receives a Radio Resource Control (RRC) connection request message 334 from user equipment device 305, and replies with RRC connection set-up message 336. Upon completion of the RRC connection set-up, user equipment device 305 sends attach request 338, which includes the GUTI as an identifier for user equipment device 305 and, in the specific example embodiment of FIGS. 3A-3C, the international mobile subscriber identity (IMSI) for the user equipment device 305. For example, as understood by the skilled artisan, the GUTI is a temporary identifier. If the GUTI is valid, the IMSI may not be needed. If, on the other hand, the GUTI is no longer valid, the IMSI may be utilized. Gateway device 310, functioning as a MAG, sends PBU message 340 to the LMA of anchor device 315. PBU message 340 includes the GUTI along with the IMSI. The MAG of gateway device 310 and the LMA of anchor device 315 use the GUTI to create the binding for the user equipment device 305.

As indicated in FIG. 3B, PBU message 340 includes an authentication vector (AV) value of "0," which indicates the need to start the authentication process with AAA server 320. Accordingly, the LMA of anchor device 315 sends AAA Access Request message 342 to AAA server 320, which includes the IMSI for user equipment device 305.

Upon receipt of the AAA Access Request message 342, AAA server 320 generates the AV for the user equipment device 305, and provides the AV to the LMA of anchor device 315 in AAA Access Accept message 344. AAA accept message 344 may include additional information, such as Quality of Service (QoS) information in the form of a QoS Class Identifier (QCI). The LMA of anchor device 315 sends this Authentication Vector to the MAG of gateway device 310 via PBA message 346. The MAG function of gateway device 310 provides the Authentication Vector to the CBSD of gateway device 310. The CBSD then transmits Authentication Request 348 to user equipment device 305, and user equipment device 305 responds with Authentication Response 350. This message is received by the CBSD of gateway device 310, which sends it to the MAG of gateway device 310. The MAG of gateway device 310 creates the binding for user equipment device 305. The MAG of gateway device 310 then sends PBU message 352 to the LMA of anchor device 315 without the AV, but instead includes the GRE key for the GRE tunnel that will be established between the MAG of gateway device 310 and the LMA of anchor device 315.

In operation 354 the LMA of anchor device 315 allocates an IP address for user equipment device 305 from the Access Point Name (APN) specified in PBU message 352.

The LMA of anchor device 315 sends PBA message 356 to the MAG of gateway device 310, which includes the IP address for user equipment device 305, as well as the Downlink GRE Key. The MAG of gateway device 310 sends this information to the CBSD of gateway device 310 as part of the trigger response. The LMA of anchor device 315 also sends AAA Accounting Start message 357 to AAA server 320.

The CBSD of gateway device 310 starts an RRC connection reconfiguration operation, which includes the exchange of RRC messages 358 and 360, Downlink Information Transfer Attach Accept message 362 and Uplink Information Transfer Attach complete message 364. The data plane between user equipment device 305 and the CBSD of gateway device 310 is established in operation 366, and the data plane between the MAG of gateway device 310 and the LMA of anchor device 315 is established in operation 368. Establishing the data plane between user equipment device 305 and the CBSD of gateway device 310 maps the Radio Access Bearer Identifier (RABID) with the GRE Key used for the GRE tunnel between the MAG of gateway device 310 and the LMA of anchor device 315. Thus, a default bearer is established for the user equipment device 305. Additional dedicated bearers may also be mapped o the GRE key used for the GRE tunnel between the MAG of gateway device 310 and the LMA of anchor device 315.

With the data planes established, user data may be transmitted between user equipment device 305 and the anchor device 315, and further on to the other services, such as services 129a-c of FIG. 1. As illustrated in call flow 300 through the establishment of the data plane in operation 368, user equipment device 305 (which sends messages according to LTE and/or 5G protocol stacks) is able to attach and authenticate to a network without using the MMEs/AMFs associated LTE/5G interfaces. Furthermore, as described above with reference to FIG. 2, the user data will be transmitted from user equipment device 305 to the CBSD of gateway device 310, provided to the MN interface of the MAG by the CTF function, and transmitted from the MAG of gateway device 310 to the LMA of anchor device via the PMIPv6 GRE tunnel.

Also illustrated in FIG. 3C is a user equipment detach process 369 according to the techniques of the present application. The detach process 369 begins when user equipment device 305 sends NAS Detach Request 370 to the CBSD of gateway device 310. The CBSD of gateway device 310 sends the detach trigger request to the MAG of gateway device 310. The MAG of gateway device 310 sends PBU deregistration message 372 to the LMA of anchor device 315, which includes a lifetime value of "0."

The LMA of anchor device 315 deletes the GRE tunnel for user equipment device 305 and starts the binding delete timer in operation 374. The LMA of anchor device 315 sends PBA success message 376 to the MAG of gateway device 310. The LMA of anchor device 315 also sends AAA Accounting Stop message 378 to AAA server 320.

The MAG of gateway device 310 deletes the GRE Tunnel for user equipment device 305 and deletes the binding for user equipment device 305 in operation 380. The MAG of gateway device 310 sends a detach trigger response to the CBSD of gateway device 310. The CBSD of gateway device 310 then sends RRC connection reconfiguration message 382.

The CBSD of gateway device 310 and user equipment device 305 exchange RRC messages 382-386, which release the connection between gateway device 310 and user equipment device 305. Finally, the delete timer expires in operation 388, and the LMA of anchor device 315 deletes the binding for user equipment device 305 in operation 390.

Figure 4A:
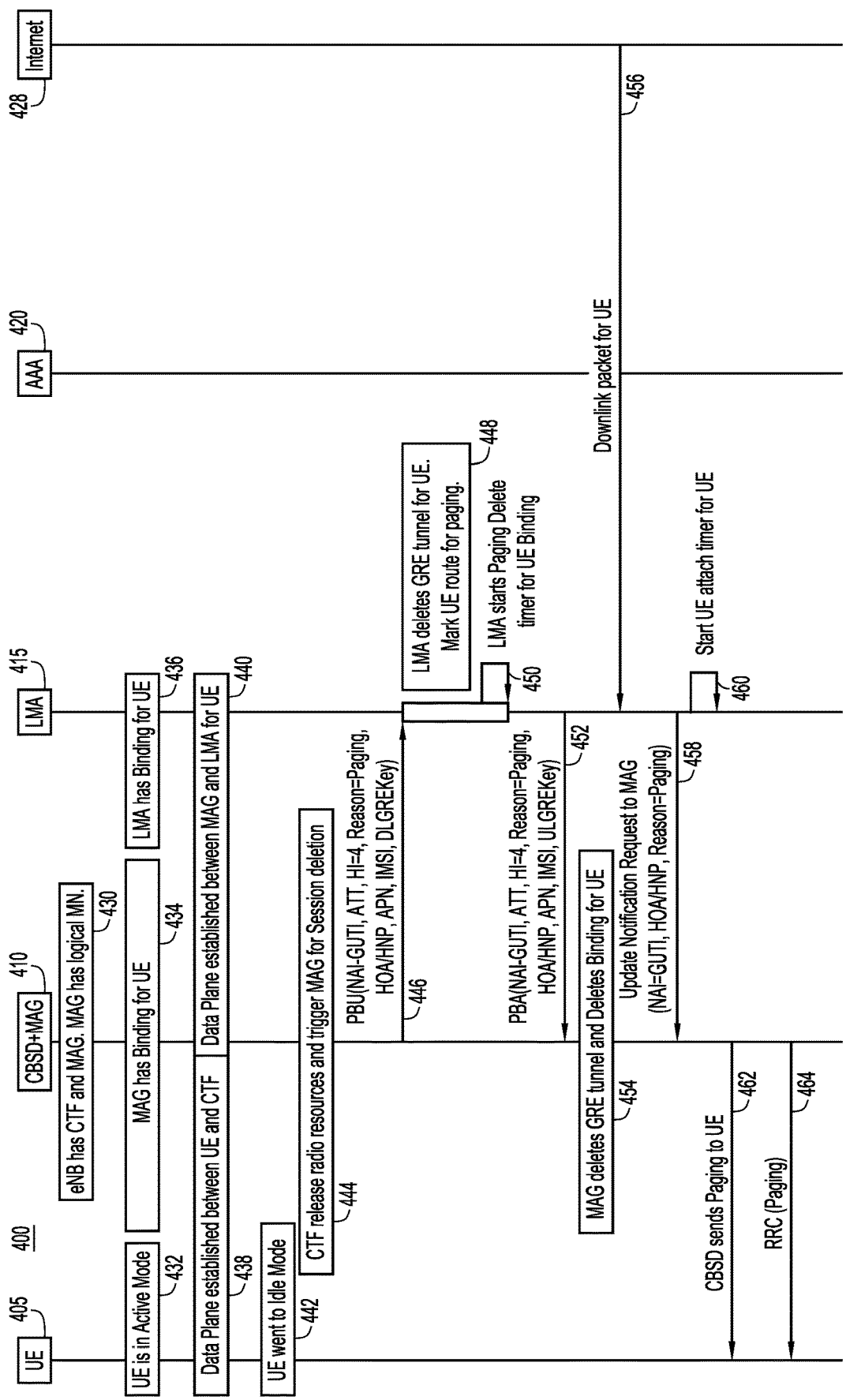
FIGS. 4A and 4B illustrate a second call flow diagram for an implementation of paging operations of the PMIPv6 mobility management system techniques of the present disclosure, according to an example embodiment.
Figure 4B:
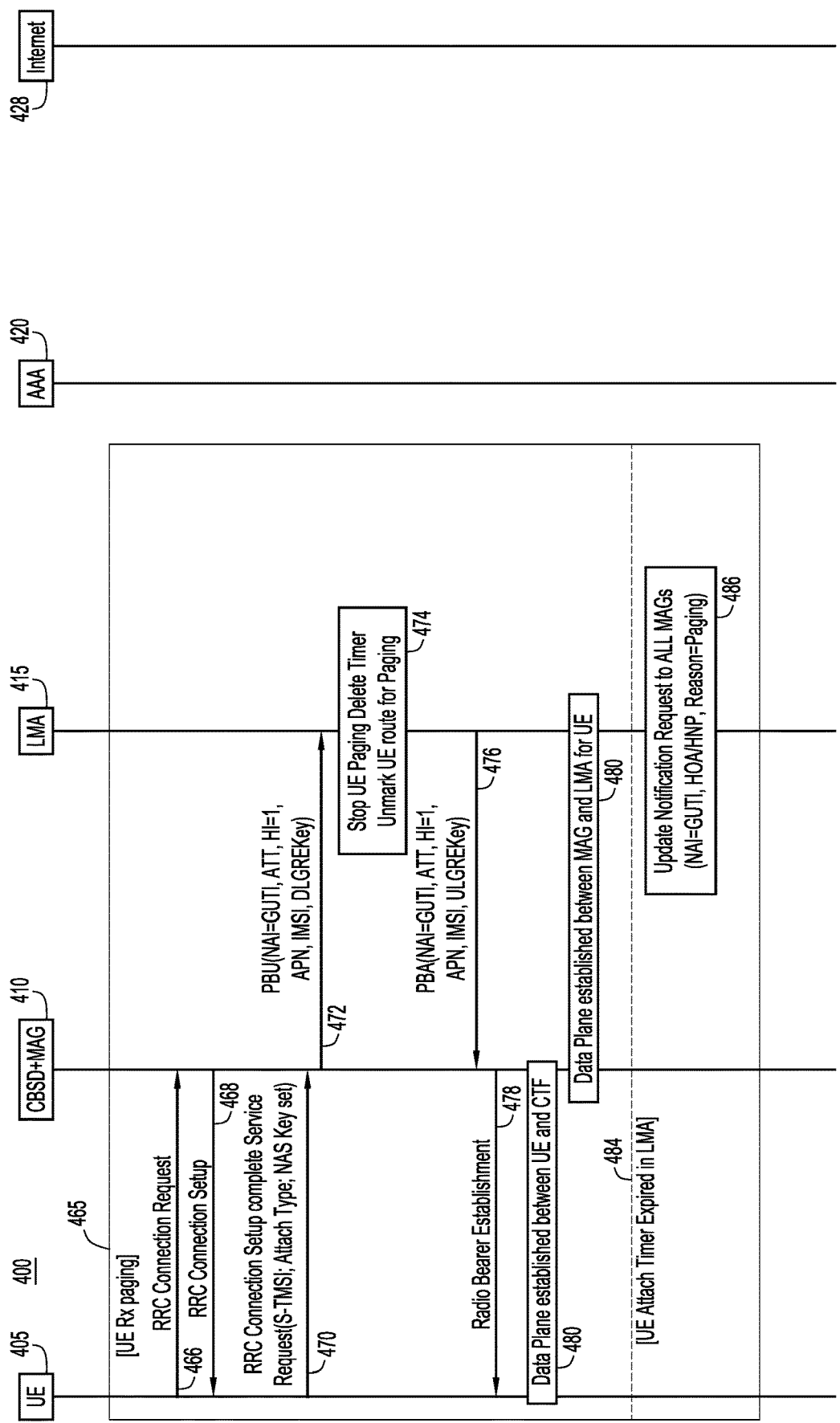

With reference now made to FIGS. 4A and 4B, depicted therein is a call flow 400 illustrating how the techniques of the present disclosure may be applied to paging of a user equipment device 405. Call flow 400 begins with the establishment of a user data plane for user equipment device 405. Accordingly, operation 430 is analogous to operation 326 of FIG. 3A. Operations 432, 434 and 436 are analogous to the state of call flow 300 after transmission of message 364, and operations 438 and 440 are analogous to operations 366 and 368 of FIG. 3B.

In operation 442, user equipment device 405 enters "Idle" mode, and the CBSD of gateway device 410 releases radio resources in operation 444. The CBSD sends a paging trigger for user equipment device 405 to the MAG of gateway device 410, which includes "Paging" as the reason in the trigger request.

In response to receiving the trigger, the MAG of gateway device 410 sends PBU message 446, which includes values indicating that the reason for the proxy binding update is "Paging," and a handoff indicator of "4," which indicates a value of "unknown."

In operation 448, the LMA of anchor device 415 deletes the GRE tunnel for user equipment device 405, and marks the route for user equipment device 405 for paging.

The LMA of anchor device 415 starts a Paging Delete Timer in operation 450. This timer may have a longer duration that the Delete Timer of operation 388 of FIG. 3C. Next, the LMA of anchor device 415 sends PBA message 452 with the reason for the message as "Paging." In response to receiving PBA message 452, the MAG of gateway device 410 deletes the GRE Tunnel and binding for user equipment device 405 in operation 454. Accordingly, as of operation 454, the radio bearers for user equipment device 405 are released as user equipment device 405 has gone idle.

In operation 456, the LMA of anchor device 415 receives a downlink packet from the internet 428 that is intended for user equipment device 405. Because the packet is destined for a device that has been marked for paging (i.e., user equipment device 405), the LMA of anchor device 415 initiates update notification request message 458 and transmits it to the MAG of gateway device 410. Included in the update notification request message 458 is an indication that the reason for the request is "Paging." The LMA of anchor device 415 also starts the paging procedure start timer in operation 460. This timer is similar to the T3413 timer that may be used in a related art LTE environment utilizing an MME.

Upon receiving the update notification request message 458 from the LMA of anchor device 415, the MAG of gateway device 410 triggers the CBSD of gateway device 410 to start paging. Accordingly, the CBSD of gateway device 410 sends paging message 462 to user equipment device 405. The paging continues with RRC paging message 464, and will continue until there is a response received from user equipment device 405. If no response is received, or user equipment device 405 has already moved out of the service area for gateway device 410, paging notifications may be sent to all MAGs registered with the LMA of anchor device 415.

In response to receiving a paging (e.g., paging message 462) user equipment reception paging operation 465 begins when user equipment device 405 sends RRC connection request 466, which initiates the reestablishment of data planes for user equipment device 405. Specifically, messages 466-470 establishes a Radio Resource Control (RRC) connection between user equipment device 405 and the CBSD of gateway device 410. This message exchange may be analogous to messages 334-338 of FIG. 3B.

After the RRC connection setup completes, the CBSD of gateway device 410 sends the service request message 470 received from user equipment device 405 to the MAG of gateway device 410. The message received at the MAG of gateway device 410 includes the GUTI and an AV value of "0." The MAG of gateway device 410 initiates the creation of data planes between user equipment device 405 and gateway device 410, as well as between gateway device 410 and anchor device 415 through PBU message 472 sent to anchor device 415.

In response to PBU message 372, the LMA of anchor device 415 stops the paging delete timer (that was started in operation 450) in operation 474. Operation 474 also unmarks for paging the user equipment route associated with user equipment device 405. The LMA of anchor device 415 sends PBA message 476 to the MAG of gateway device 410. The MAG of gateway device 410 establishes the radio bearer with user equipment device 405 via message 478, and in operations 480 and 482 the data plane between user equipment device 405 and gateway device 410 and the data plane between gateway device 410 and anchor device 415 are established, respectively. Finally, at time 484 the user equipment attach time set in operation 460 in the LMA of anchor device 415 expires, which results in the LMA of anchor device 415 sending an update notification request message to all MAGs in operation 486. These messages include "Paging" as the reason for the message.

The example embodiment of FIGS. 4A and 4B does not include optional authentication operations that may be included between user equipment device 405 responding to the paging request via message 466 and the establishment of the user data planes in operations 480 and 482. Accordingly, other example embodiments of call flow 400 may include authentication operations that utilize AAA server 420 that are analogous to the authentication messages and operations illustrated in FIG. 3B, above.

As illustrated through the call flow 400 of FIGS. 4A and 4B, paging mobility management operations may be implemented for LTE or 5G user equipment without relying on and MME or AMF of the respective 3GPP standards. The techniques of the present disclosure may also be applied to hand-over mobility management operations, as illustrated in FIG. 5.

Figure 5:
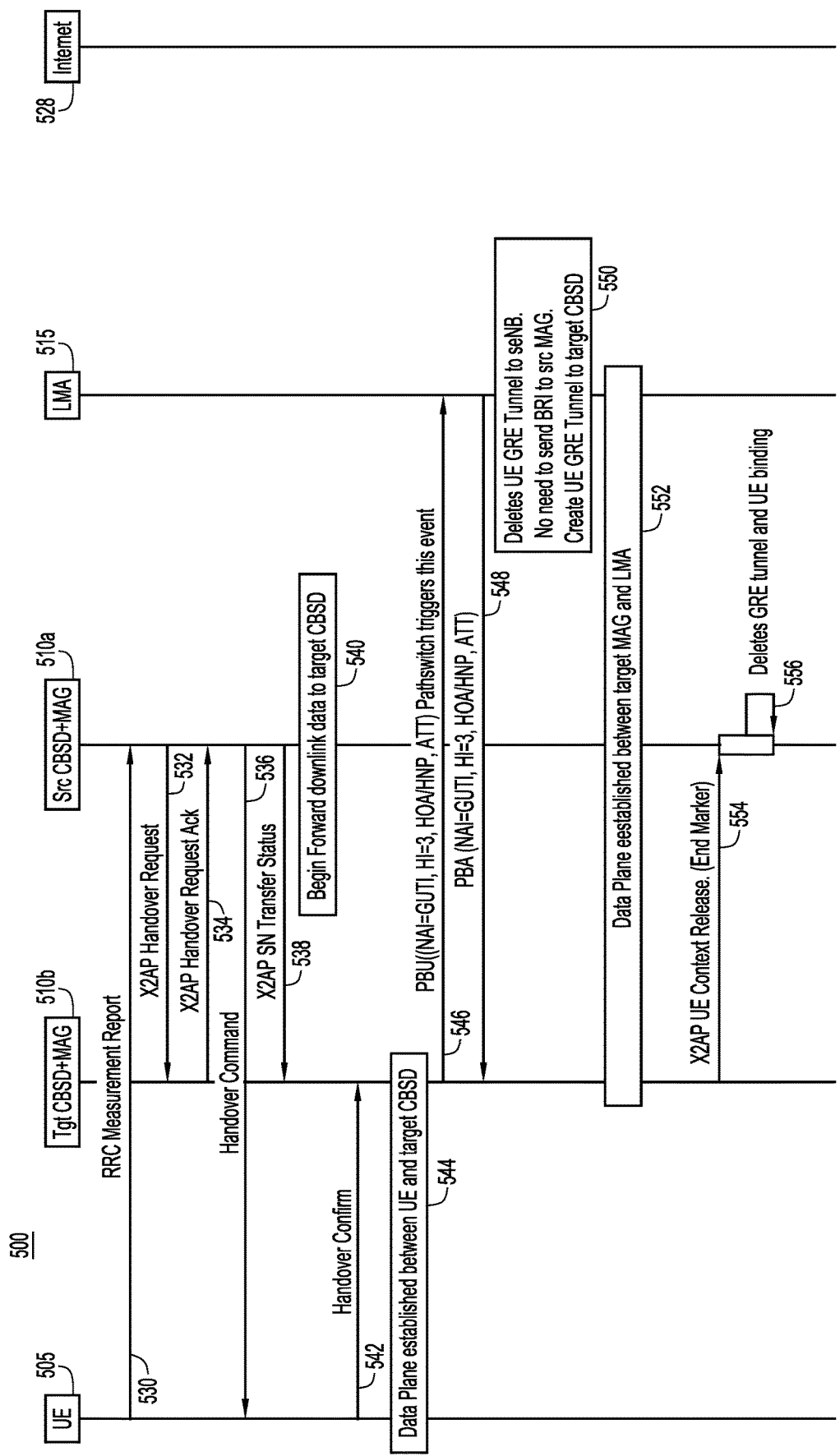
FIG. 5 is a third call flow diagram illustrating an implementation of handover operations of the PMIPv6 mobility management system techniques of the present disclosure, according to an example embodiment.

With reference now made to FIG. 5, depicted therein is a call flow 500 illustrating a call handover operation according to the techniques of the present disclosure. Included in call flow 500 are messages and operations implemented by user equipment device 505, a source gateway device 510a, a target gateway device 510b, an anchor device 515, and the internet 528. Like gateway devices 310 and 410 of FIGS. 3A-3C, 4A and 4B, gateway devices 510a and 510b implement both CBSDs and MAGs. Like anchor devices 315 and 415 of FIGS. 3A-3C, 4A and 4B, anchor device 515 implements an LMA. Call flow 500 illustrates a process by which LTE or 5G user equipment device 505 will be handed over from source gateway device 510a to target gateway device 510b through the use of PMIPv6 without utilizing an MME or AMF of the respective 3GPP standards.

Call flow 500 begins with messages 530-538 and 542 and operations 540 and 544. These messages and operations represent a related art handover process utilizing the X2 interface between eNBs according to the LTE standard, though the skilled artisan will understand that the techniques described herein may also be applied to the XN interface handover process of the 5G standard. Accordingly, call flow 500 begins with RRC measurement report message 530 being sent to the CBSD of source gateway device 510a. Based on RRC measurement report message 530, the CBSD of gateway device 510a determines that a handover to the CBSD of gateway device 510b is appropriate. Therefore, the CBSD of gateway device 510a sends X2 Application Protocol (X2AP) handover request message 532 to the CBSD of gateway device 510b. The request of message 532 is acknowledged in X2AP acknowledgement message 534.

In response to this acknowledgement, the CBSD of gateway device 510a sends a handover command message 536 to user equipment device 505, as well as X2AP Sequence Number (SN) Transfer Status message 538 to the CBSD of gateway device 510b. The CBSD of source gateway device 510a begins downlinking data to the CBSD of target gateway device 510b in operation 540. The handover is confirmed by the CBSD of target gateway device 510b via message 542. Finally, the data plane between user equipment device 505 and the CBSD of target gateway device 510b is established in operation 544.

The establishment of the data plane in operation 544 triggers the CBSD of target gateway device 510b to send a path switch request message of user equipment device 505 to the MAG of target gateway device 510b. The MAG of target gateway device 510b sends PBU message 546 to the LMA of anchor device 515 with a Handover Initiate (HI) value of "3," which indicates that the type of handover is an inter-MAG handover. PBU message 546 also indicates that the Network Access Identifier is the GUTI. The LMA responds with PBA message 548, deletes the GRE tunnel between the LMA of anchor device 515 and the MAG of source gateway device 510a in operation 550, and creates a GRE tunnel between the LMA of anchor device 515 and the MAG of target gateway device 510b in operation 552.

The CBSD of target gateway device 510b sends X2AP User Equipment Context Release Message 554 to the CBSD of source gateway device 510a. Message 554 is also referred to as an End Marker message. Upon receiving the End Marker message, the CBSD of source gateway device 510a deletes the user equipment context for user equipment device 505 and triggers a path switch request to the MAG of source gateway device 510a in which the reason is given as "End Marker." The MAG of source gateway device 510a deletes the user equipment binding with user equipment device 505 in operation 556.

As with the call flows of FIGS. 3A-3C, 4A and 4B, call flow 500 provides a process by which PMIPv6 may be leveraged to provide mobility management, in this case a user equipment handover operation, for LTE or 5G user equipment without utilizing an MME or AMF.

Figure 6:
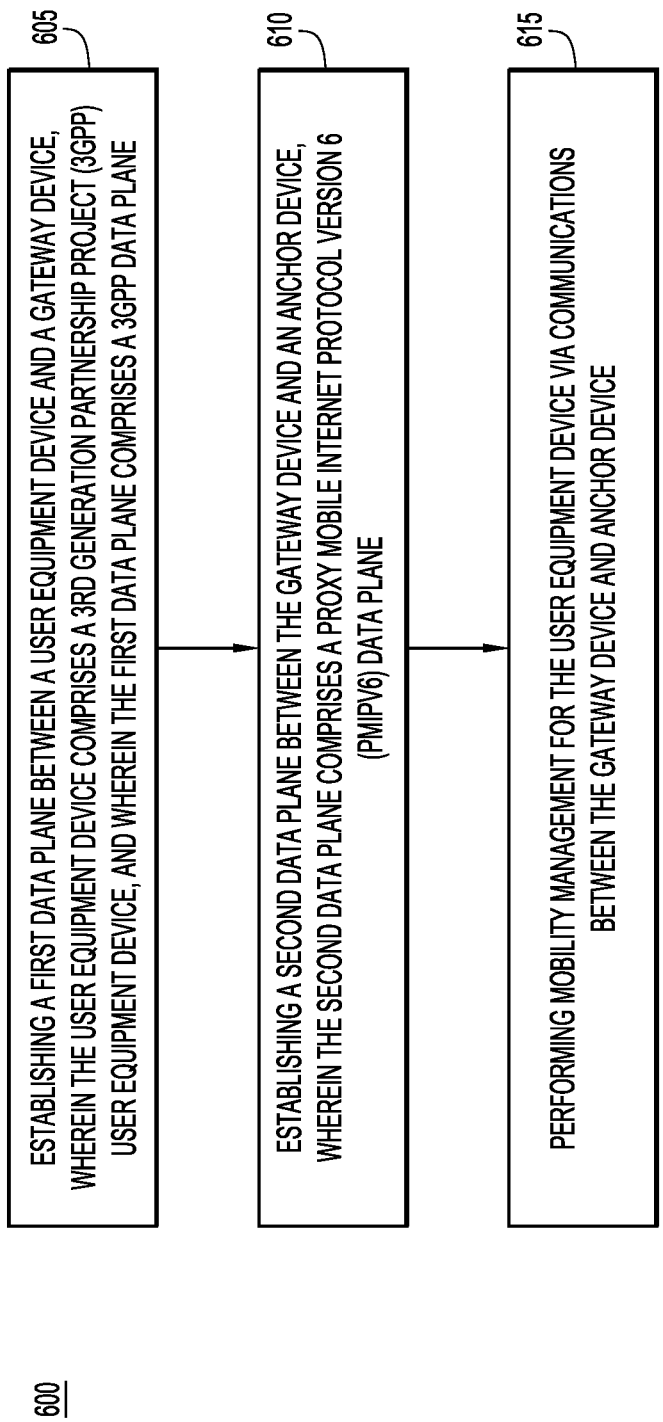
FIG. 6 is a first flowchart illustrating a first process flow for implementing the PMIPv6 mobility management system techniques of the present disclosure, according to an example embodiment.

With reference now made to FIG. 6, depicted therein is a flowchart 600 illustrating a process flow for implementing the techniques of the present disclosure. The process flow begins in operation 605 in which a first data plane is established between a user equipment device and a gateway device. The user equipment device may be embodied as a 3GPP user equipment device. According to more specific example embodiments, the user equipment device may be embodied as an LTE user equipment device or a 5G user equipment device. Similarly, the first data plane may be embodied as a 3GPP data plane, and in more specific example embodiments, as an LTE or 5G data plane, such as the data planes described above with reference to FIGS. 1, 2, 3A-3C, 4A, 4B and 5. As used herein a "3GPP data plane" refers to a data plane that provides for communication using the 3GPP protocols and/or standards. Accordingly, a 3GPP data plane established between a user equipment device and a gateway device would refer to a data plane that provides for communication between the user equipment device and the gateway device using the 3GPP protocols and/or standards. According to specific example embodiments, the gateway device may implement an LTE eNB or 5G gNB in conjunction with a PMIPv6 MAG, as described above with reference to FIGS. 1, 2, 3A-3C, 4A, 4B and 5.

In operation 610, a second data plane is established between the gateway device and an anchor device. The second data plane may be embodied as a PMIPv6 data plane. According to specific example embodiments, the anchor device may implement a PMIPv6 LMA, as described above with reference to FIGS. 1, 2, 3A-3C, 4A, 4B and 5 above.

Finally, in operation 615, a mobility management operation may be performed for the user equipment device via communications between the gateway device and the anchor device. According to specific example embodiments, the mobility management operation may include one or more of attach, detach, paging and handover operations described above with reference to FIGS. 3A-3C, 4A, 4B and 5. Example embodiments of operation 615 may perform the mobility management operation without using and/or without leveraging an LTE MME and/or a 5G AMF.

Accordingly, the process flow of flowchart 600 provides a process for NAS termination on an eNB/gNB, and for building the interworking with a PMIPv6 mobility management system. The techniques embodied in the process flow of flowchart 600 may leverage the PMIPv6 mobility management system to provide mobility management in, for example, Private LTE/Private 5G environments. Such techniques may provide NAS termination and mobility management without leveraging an MME/AMF, or any of the other Evolved Packet Core (EPC)/5G Core (5GC) elements.

Figure 7:
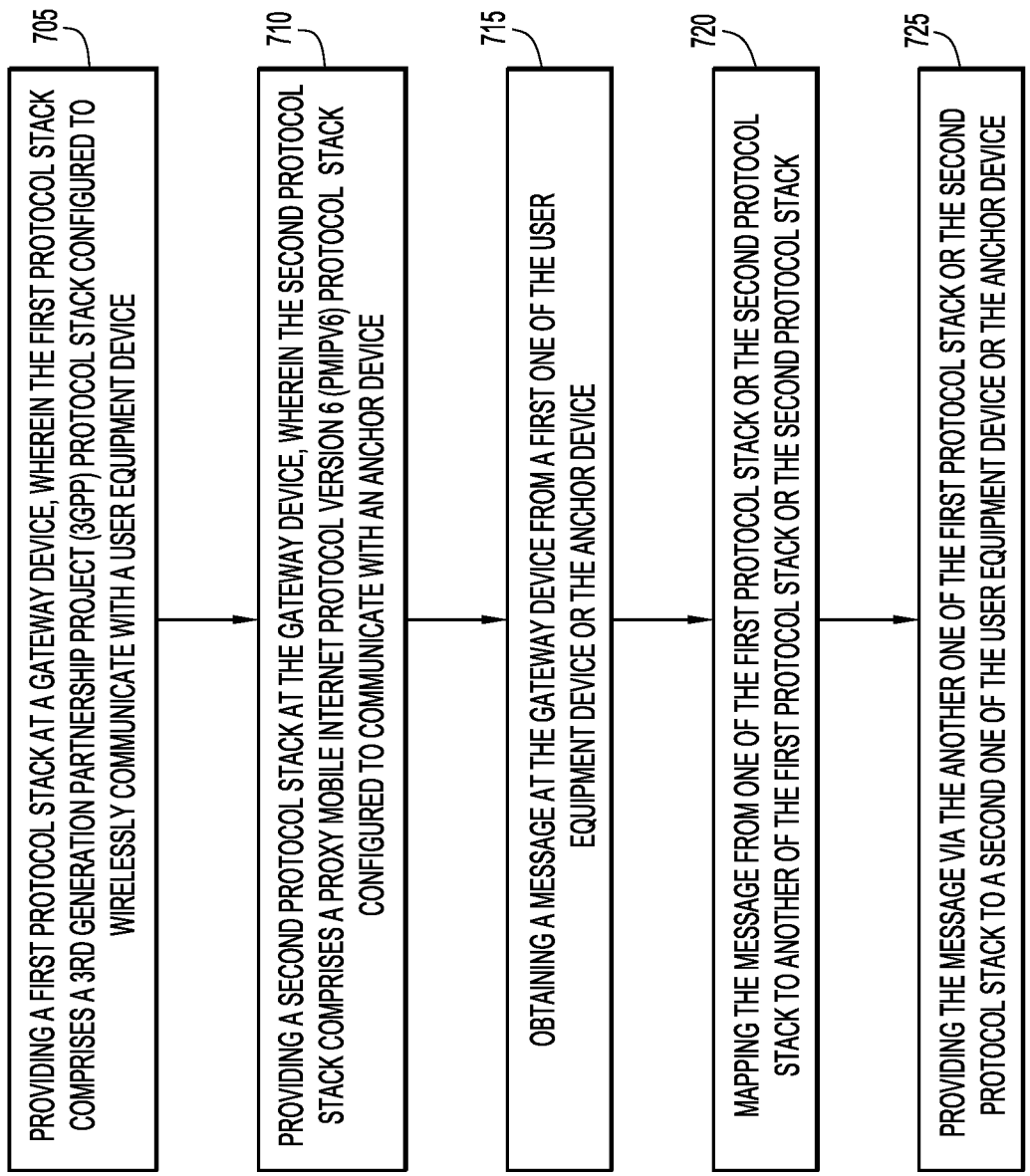
FIG. 7 is a second flowchart illustrating a second process flow for implementing the PMIPv6 mobility management system techniques of the present disclosure, according to an example embodiment.

With reference now made to FIG. 7, depicted therein is a flowchart 700 illustrating a second process flow for implementing the techniques of the present disclosure. The process flow begins in operation 705 in which a first protocol stack is provided at a gateway device. The first protocol stack may be embodied as a 3GPP protocol stack, such as an LTE protocol stack or a 5G protocol stack. The first protocol stack may be configured to wirelessly communicate with one or more user equipment devices. For example, the first protocol stack may be configured to communicate using the eNB/gNB protocols described with reference to FIG. 2. The first protocol stack may also be configured to communicate using the message types transmitted between the user equipment devices 305/405/505 and the gateway devices 310/410/510a/510b described with reference to FIGS. 3A-3C, 4A, 4B and 5.

In operation 710, a second protocol stack is provided at the gateway device. The second protocol stack may be embodied as a PMIPv6 protocol stack configured to communicate with an anchor device. For example, the second protocol stack may be configured to communicate using the PMIPv6 protocols described in FIG. 2. The second protocol stack may also be configured to communicate using the message types transmitted between the gateway devices 310/410/510a/510b and the anchor devices 315/415/515 described with reference to FIGS. 3A-3C, 4A, 4B and 5.

In operation 715, a message is obtained at the gateway device from the user equipment device or the anchor device. For example, operation 715 may be embodied as one of the numerous message exchanges described with reference to FIGS. 3A-3C, 4A, 4B and 5 in which a message is obtained at gateway devices 310/410/510a/510b.

In operation 720, the message from one of the first protocol stack or the second protocol stack is mapped to another of the first protocol stack or the second protocol stack. In operation 725, the message is provided via the another one of the first protocol stack or the second protocol stack to a second one of the user equipment or the anchor device. For example, as described above with reference to FIGS. 3A-3C, 4A, 4B and 5, certain messages obtained at the eNB/gNB of gateway devices 310/410/510a/510b from user equipment devices 305/405/505 trigger actions and messages transmitted from the gateway devices 310/410/510a/510b to the anchor devices 315/415/515. The mapping of the message from the forms in which they are obtained to the forms in which they are transmitted may be an example embodiment of operation 720 and the transmission would be an example embodiment of operation 725. According to other example embodiments, certain messages obtained at the MAG of gateway devices 310/410/510a/510b from anchor devices 315/415/505 trigger actions and messages transmitted from the gateway devices 310/410/510a/510b to the user equipment devices 305/405/505. The mapping of the message from the forms in which they are obtained to the forms in which they are provided may be an example embodiment of operation 720 and the transmission would be an example embodiment of operation 725.

Figure 8:
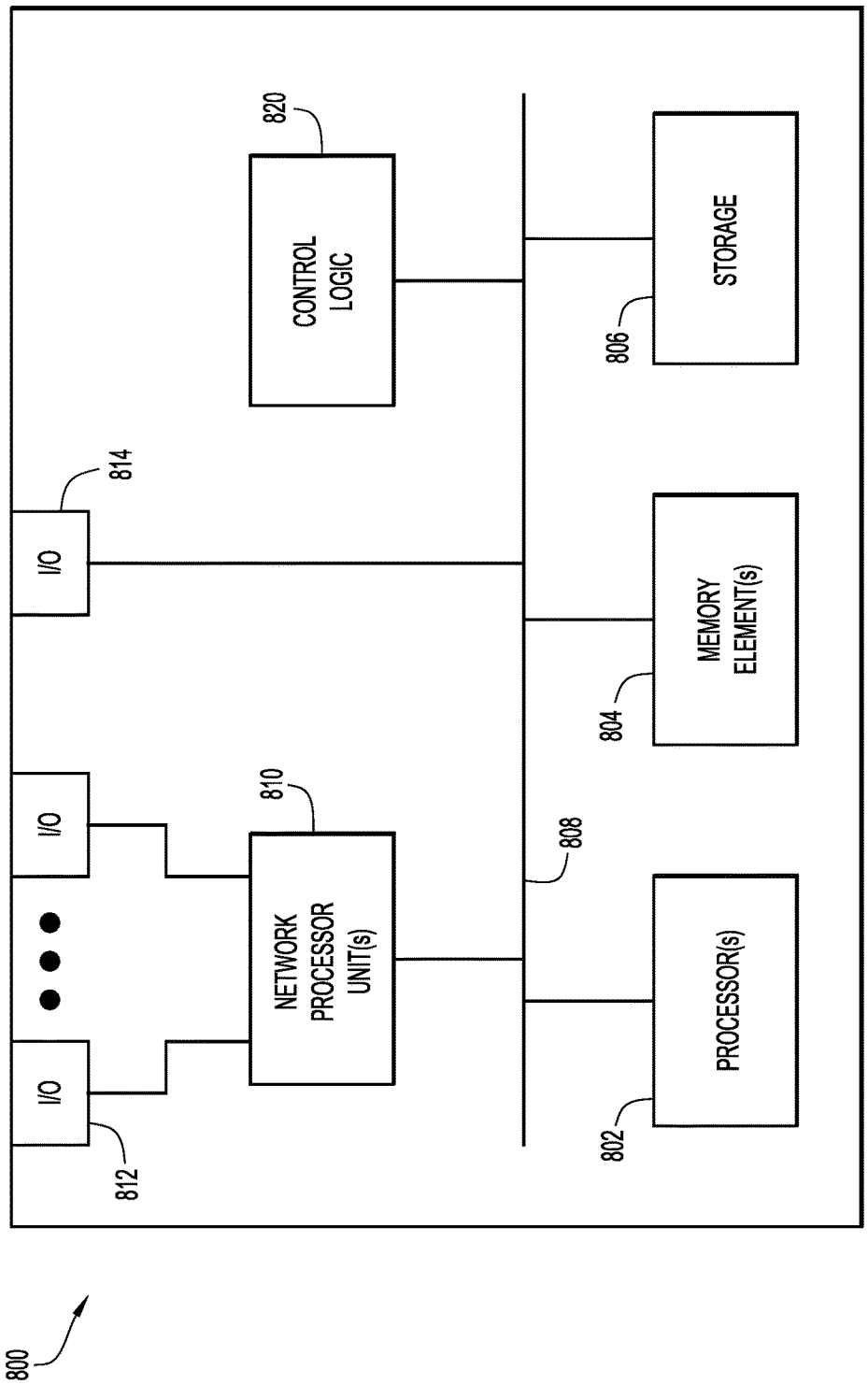
FIG. 8 is a functional block diagram of a device configured to implement the PMIPv6 mobility management system techniques of the present disclosure, according to an example embodiment.

Referring to FIG. 8, FIG. 8 illustrates a hardware block diagram of a computing device 800 that may perform functions associated with operations discussed herein in connection with the techniques depicted in FIGS. 1, 2, 3A-3C, 4A, 4B and 5-7. In various embodiments, a computing device, such as computing device 800 or any combination of computing devices 800, may be configured as any entity/entities as discussed for the techniques depicted in connection with FIGS. 1, 2, 3A-3C, 4A, 4B and 5-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element". Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as "messages", "messaging", "signaling", "data", "content", "objects", "requests", "queries", "responses", "replies", etc. which may be inclusive of packets. As referred to herein and in the claims, the term "packet" may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a "payload", "data payload", and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in "one embodiment", "example embodiment", "an embodiment", "another embodiment", 'certain embodiments", "some embodiments", "various embodiments", "other embodiments", "alternative embodiment", and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of", "one or more of", "and/or", variations thereof, or the like are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

Additionally, terms such as "transmit" and "receive" are broadly used herein to refer to techniques for providing and obtaining data in network environments. For example, data may be provided and obtained through packets transmitted and received through network environment 100 of FIG. 1 (or as described with reference to the communications illustrated in FIGS. 2, 3A-3C, 4A, 4B and 5). Data may also be provided and obtained through data communicated via out-of-band signaling or control channels used in network environment 100 of FIG. 1 (or as described with reference to the communications illustrated in FIGS. 2, 3A-3C, 4A, 4B and 5).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein are approaches for NAS termination on eNBs/gNBs, and for building interworking with a PMIPv6 mobility management system. According to the disclosed techniques, the MME/AMF of LTE/5G systems may be eliminated, as may other EPC/5GC elements. The techniques may leverage the PMIPv6 mobility management system for supporting Private LTE/Private 5G access. Example embodiments of these techniques:

Eliminate the need for the 3GPP EPC core. In its place, the lightweight PMIPv6 mobility management system may be used to support Private LTE/5G access in enterprise architectures.
  Leverage the LMA functionality. By leveraging this functionality, the techniques may be implemented on multiple platform options without requiring new development, other than that which may be involved to provide protocol extensions, such as those described above with reference to FIGS. 3A-3C, 4A, 4B and 5.

Bring operational simplicity to LTE and 5G access management, with an access agnostic mobility management core.

As illustrated through FIGS. 1, 2, 3A-3C, 4A, 4B and 5-7 and the accompanying discussion, the techniques of the present disclosure provide for the implementation of, for example, a Private LTE/5G network in which PMIPv6 is used to handle mobility management functions. In such LTE network environments, NAS signaling may be handled via a gateway device that implements an eNB in conjunction with a MAG. Similarly, NAS signaling security may be provided for via a gateway device that implements an eNB in conjunction with a MAG. Also according to the techniques of the present disclosure, a Packet Data Network Gateway may be handled through a gateway device that implements an eNB in conjunction with a MAG. As also described above, Authentication, Authorization and Security may be handled through a gateway device that implements an eNB in conjunction with a MAG and an anchor device that implements an LMA. Bearer management functions, including dedicated bearer establishment, may be handled through a gateway device that implements an eNB in conjunction with a MAG and an anchor device that implements an LMA. Finally, context management procedures may be handled through a gateway device that implements an eNB in conjunction with a MAG.

In 5G environments, mobility management may be handled by a gateway device 110 that implements a gNB in conjunction with a MAG. Security and authentication may be handled by an anchor device 115 that implements an LMA. Session management may be handled by an anchor device 115 that implements an LMA. Finally, user plane functions may be handled by an anchor device 115 that implements an LMA.

According the techniques described herein, methods are provided for that include: establishing a first data plane between a user equipment device and a gateway device, wherein the user equipment device comprises a 3rd Generation Partnership Project (3GPP) user equipment device, and wherein the first data plane comprises a 3GPP data plane; establishing a second data plane between the gateway device and an anchor device, wherein the second data plane comprises a Proxy Mobile Internet Protocol version 6 (PMIPv6) data plane; and performing mobility management for the user equipment device via communications between the gateway device and the anchor device.

According to specific example embodiments of the provided for methods, the user equipment device comprises a Long Term Evolution (LTE) user equipment device or a Fifth Generation Mobile Network (5G) user equipment device; the first data plane comprises an LTE or 5G data plane; the gateway device is configured to implement an Evolved Node B or a Next Generation Node B; the gateway device is configured to implement a PMIPv6 Mobile Access Gateway (MAG); the first data plane is configured to provide data between the Evolved Node B or the Next Generation Node B and the user equipment device; and the second data plane is configured to provide data between the MAG and a Local Mobility Anchor (LMA) implemented at the anchor device.

Specific example embodiments of the provided for methods may also provide for performing mobility management for the user equipment device by performing mobility management for the user equipment device without using an LTE Mobility Management Entity (MME) device or a 5G Access and Mobility Management Function (AMF) device.

Other specific example embodiments of the provided for methods may provide for performing mobility management for the user equipment device by performing session management for the user equipment device without using an LTE Mobility Management Entity (MME) device or a 5G Session Management Function (SMF) device.

According to specific example embodiments of the provided for methods, performing mobility management for the user equipment device may include performing a detach operation for the user equipment device.

According to other specific example embodiments of the provided for methods, performing mobility management for the user equipment device may include performing a paging operation for the user equipment device.

According to still other specific example embodiments of the provided for methods, performing mobility management for the user equipment device may include performing a handover operation for the user equipment device.

Example embodiments of the provided for methods also provide for establishing the first data plane and establishing the second data plane by mapping a General Packet Radio Service (GPRS) tunneling protocol (GTP) Tunnel Endpoint Identifier (TEID) of the first data plane to a Generic Routing Encapsulation (GRE) key of the second data plane.

Finally, example embodiments of the provided for methods may also include providing Non-Access Stratum Signaling (NAS) termination at the gateway device.

Other example embodiment methods include: providing a first protocol stack at a gateway device, wherein the first protocol stack comprises a 3rd Generation Partnership Project (3GPP) protocol stack configured to wirelessly communicate with a user equipment device; providing a second protocol stack at the gateway device, wherein the second protocol stack comprises a Proxy Mobile Internet Protocol version 6 (PMIPv6) protocol stack configured to communicate with an anchor device; obtaining a message at the gateway device from a first one of the user equipment device or the anchor device; mapping the message from one of the first protocol stack or the second protocol stack to another of the first protocol stack or the second protocol stack; and providing the message via the another one of the first protocol stack or the second protocol stack to a second one of the user equipment devices or the anchor device.

According to these other example embodiment methods, obtaining the message may include obtaining a non-access stratum (NAS) signaling message from the user equipment device and performing NAS termination; and mapping the message may include mapping the NAS signaling message to a PMIPv6 control plane message.

Also according to these other example embodiment methods, obtaining the message may include obtaining a Long Term Evolution (LTE) or a Fifth Generation Mobile Network (5G) data plane message; and mapping the message may include mapping the LTE or 5G data plane message to a PMIPv6 data plane message.

According to still others of these example embodiment methods, mapping the LTE or 5G data plane message to a PMIPv6 data plane message may include mapping a General Packet Radio Service (GPRS) tunneling protocol (GTP) Tunnel Endpoint Identifier (TEID) to a Generic Routing Encapsulation (GRE) key.

Also according to these other example embodiment methods, obtaining the message may include obtaining an attach request message from the user equipment device; mapping the message may include mapping the attach request message to a Proxy Binding Update (PBU) message; and providing the message may include providing the PBU message to the anchor device.

According to still other example embodiments of these other methods, providing the second protocol stack at the gateway device may include providing the second protocol stack configured to communicate with a PMIPv6 Local Mobility Anchor (LMA).

Finally, according to other example embodiments of these other methods, the gateway device may be configured to serve as an Evolved Node B or a Next Generation Node B for messages provided to or obtained from the user equipment device and configured to serve as a Mobile Access Gateway (MAG) for messages provided to or obtained from the anchor device.

Also provided for by the techniques of the present disclosure are apparatuses that include one or more network interfaces and one more processors. The one or more processors may be configured to: establish, via the one or more network interfaces, a first data plane between a user equipment device and the apparatus, wherein the user equipment device comprises a 3rd Generation Partnership Project (3GPP) user equipment device, and wherein the first data plane comprises a 3GPP data plane; establish, via the one or more network interfaces, a second data plane between the apparatus and an anchor device, wherein the second data plane comprises a Proxy Mobile Internet Protocol version 6 (PMIPv6) data plane; and perform mobility management for the user equipment device via communications sent via the network interfaces between the apparatus and the anchor device.

According to specific example embodiments of the provided for apparatuses, the one or more processors may be configured to implement an Evolved Node B or a Next Generation Node B; the one or more processors may be configured to implement a PMIPv6 Mobile Access Gateway (MAG); the first data plane may be configured to provide data between the Evolved Node B or the Next Generation Node B and the user equipment device; and the second data plane may be configured to provide data between the MAG and a Local Mobility Anchor (LMA) implemented at the anchor device.

According to other example embodiments of the provided for apparatuses, the one or more processors may be configured to perform mobility management for the user equipment device without using an LTE Mobility Management Entity (MME) device or a 5G Access and Mobility Management Function (AMF) device.

According to still other example embodiments of the provided for apparatuses, the one or more processors may be configured to perform the mobility management for the user equipment device by performing one or more of a detach operation for the user equipment device, a paging operation for the user equipment device, or a handover operation for the user equipment device.

According to other example embodiments, the one or more processors may be configured to: provide a first protocol stack, wherein the first protocol stack comprises a 3rd Generation Partnership Project (3GPP) protocol stack configured to wirelessly communicate with a user equipment device via the one or more network interfaces; provide a second protocol stack, wherein the second protocol stack comprises a Proxy Mobile Internet Protocol version 6 (PMIPv6) protocol stack configured to communicate with an anchor device via the one or more network interfaces; obtain, via the one or more network interfaces, a message from a first one of the user equipment device or the anchor device; map the message from one of the first protocol stack or the second protocol stack to another of the first protocol stack or the second protocol stack; and transmit the message, via the another one of the first protocol stack or the second protocol stack and the one or more network interfaces, to a second one of the user equipment devices or the anchor device.

According to these other example embodiment apparatuses, the one or more processors may be configured to obtain the message by obtaining a non-access stratum (NAS) signaling message from the user equipment device and performing NAS termination; and map the message by mapping the NAS signaling message to a PMIPv6 control plane message.

Also according to these other example embodiment apparatuses, the one or more processors may be configured to obtain the message by obtaining a Long Term Evolution (LTE) or a Fifth Generation Mobile Network (5G) data plane message; and map the message by mapping the LTE or 5G data plane message to a PMIPv6 data plane message.

According to still other example embodiment apparatuses, the one or more processors may be configured to map the LTE or 5G data plane message to a PMIPv6 data plane message by mapping a General Packet Radio Service (GPRS) tunneling protocol (GTP) Tunnel Endpoint Identifier (TEID) to a Generic Routing Encapsulation (GRE) key.

According to still other example embodiments, the one or more processors may be configured to obtain the message by obtaining an attach request message from the user equipment device; mapping the message may include mapping the attach request message to a Proxy Binding Update (PBU) message; and providing the message may include providing the PBU message to the anchor device.

Also according to still other example embodiments, the one or more processors may be configured to provide the second protocol stack by providing the second protocol stack configured to communicate with a PMIPv6 Local Mobility Anchor (LMA).

Finally, according to still other example embodiment apparatuses, the one or more processors may be configured to serve as an Evolved Node B or a Next Generation Node B for messages provided to or obtained from the user equipment device and configured to serve as a Mobile Access Gateway (MAG) for messages provided to or obtained from the anchor device.

Also provided for according to the techniques of the present disclosure are one or more tangible non-transitory computer readable mediums. The computer readable mediums may be encoded with instructions, which when executed by one or more processors, are operable to: establish a first data plane between a user equipment device and a gateway device, wherein the user equipment device comprises a 3rd Generation Partnership Project (3GPP) user equipment device, and wherein the first data plane comprises a 3GPP data plane; establish a second data plane between the gateway device and an anchor device, wherein the second data plane comprises a Proxy Mobile Internet Protocol version 6 (PMIPv6) data plane; and perform mobility management for the user equipment device via communications between the gateway device and the anchor device.

According to other example embodiments, the computer readable mediums may be encoded with instructions, which when executed by one or more processors, are operable to: provide a first protocol stack at a gateway device, wherein the first protocol stack comprises a 3rd Generation Partnership Project (3GPP) protocol stack configured to wirelessly communicate with a user equipment device; provide a second protocol stack at the gateway device, wherein the second protocol stack comprises a Proxy Mobile Internet Protocol version 6 (PMIPv6) protocol stack configured to communicate with an anchor device; obtain a message at the gateway device from a first one of the user equipment device or the anchor device; map the message from one of the first protocol stack or the second protocol stack to another of the first protocol stack or the second protocol stack; and provide the message via the another one of the first protocol stack or the second protocol stack to a second one of the user equipment devices or the anchor device.

The above described computer readable mediums may be further encoded with instructions, which when executed by one or more processors, are operable to perform operations analogous to any of the above-described methods and/or apparatuses.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    establishing a first data plane between a user equipment device and a gateway device, wherein the user equipment device comprises a 3rd Generation Partnership Project (3GPP) user equipment device, wherein the gateway device is configured to implement a Proxy Mobile Internet Protocol version 6 (PMIPv6) Mobile Access Gateway (MAG), and wherein the first data plane comprises a 3GPP data plane;
    establishing a second data plane between the gateway device and an anchor device, wherein the second data plane comprises a PMIPv6 data plane, and wherein the anchor device is configured to implement a PMIPv6 Local Mobility Anchor (LMA); and
    performing a paging mobility management operation for the user equipment device under control of the MAG and the LMA without use of or control by an LTE Mobility Management Entity (MME) device or a 5G Access and Mobility Management Function (AMF) device, the paging mobility management operation comprising the LMA initiating paging of the user equipment device by sending a message from the LMA to the MAG and initiating a paging timer at the LMA.

2. The method according to claim 1, wherein:
    the user equipment device comprises a Long Term Evolution (LTE) user equipment device or a Fifth Generation Mobile Network (5G) user equipment device;
    the first data plane comprises an LTE or 5G data plane;
    the gateway device is configured to implement an Evolved Node B or a Next Generation Node B; and
    the first data plane is configured to provide data between the Evolved Node B or the Next Generation Node B and the user equipment device.

3. The method of claim 1, further comprising performing session management for the user equipment device without using an LTE MME device or a 5G Session Management Function (SMF) device.

4. The method of claim 1, further comprising performing a detach operation for the user equipment device comprising the MAG sending a deregistration message to the LMA.

5. The method of claim 1, further comprising performing a handover operation for the user equipment device comprising the MAG initiating the handover operation by sending a handover initiation message to the LMA.

6. The method of claim 1, wherein establishing the first data plane and establishing the second data plane comprises mapping a General Packet Radio Service (GPRS) tunneling protocol (GTP) Tunnel Endpoint Identifier (TEID) of the first data plane to a Generic Routing Encapsulation (GRE) key of the second data plane.

7. The method of claim 1, further comprising providing Non-Access Stratum Signaling (NAS) termination at the gateway device.

8. A method comprising:
    providing a first protocol stack at a gateway device, wherein the first protocol stack comprises a 3rd Generation Partnership Project (3GPP) protocol stack configured to wirelessly communicate with a user equipment device;
    providing a second protocol stack at the gateway device, wherein the second protocol stack comprises a Proxy Mobile Internet Protocol version 6 (PMIPv6) protocol stack configured to implement a PMIPv6 Mobile Access Gateway (MAG), communicate with a Local Mobility Anchor (LMA) implemented at an anchor device, and provide a paging mobility management operation for the user equipment device under control of the MAG and the LMA without use of or control by an LTE Mobility Management Entity (MME) device or a 5G Access and Mobility Management Function (AMF) device, the paging mobility management operation comprising the LMA initiating paging of the user equipment device by sending a message from the LMA to the MAG and initiating a paging timer at the LMA;
    obtaining a message at the gateway device from a first one of the user equipment device or the anchor device;
    mapping the message from one of the first protocol stack or the second protocol stack to another of the first protocol stack or the second protocol stack; and
    providing the message via the another one of the first protocol stack or the second protocol stack to a second one of the user equipment device or the anchor device.

9. The method of claim 8, wherein:
    obtaining the message comprises obtaining a non-access stratum (NAS) signaling message from the user equipment device and performing NAS termination; and
    mapping the message comprises mapping the NAS signaling message to a PMIPv6 control plane message.

10. The method of claim 8, wherein:
    obtaining the message comprises obtaining a Long Term Evolution (LTE) or a Fifth Generation Mobile Network (5G) data plane message; and
    mapping the message comprises mapping the LTE or 5G data plane message to a PMIPv6 data plane message.

11. The method of claim 10, wherein mapping the LTE or 5G data plane message to a PMIPv6 data plane message comprises mapping a General Packet Radio Service (GPRS) tunneling protocol (GTP) Tunnel Endpoint Identifier (TEID) to a Generic Routing Encapsulation (GRE) key.

12. The method of claim 8, wherein:
    obtaining the message comprises obtaining an attach request message from the user equipment device at the MAG of the gateway device;
    mapping the message comprises mapping the attach request message to a Proxy Binding Update (PBU) message; and
    providing the message comprises providing the PBU message to the LMA of the anchor device.

13. The method of claim 8, wherein the gateway device is configured to serve as an Evolved Node B or a Next Generation Node B for messages provided to or obtained from the user equipment device.

14. An apparatus comprising:
one or more network interfaces; and
one or more processors; wherein the one or more processors are configured to:
    implement a Proxy Mobile Internet Protocol version 6 (PMIPv6) Mobile Access Gateway (MAG) configured to communicate with a PMIPv6 Local Mobility Anchor (LMA) implemented at an anchor device;
    establish, via the one or more network interfaces, a first data plane between a user equipment device and the apparatus, wherein the user equipment device comprises a 3rd Generation Partnership Project (3GPP) user equipment device, and wherein the first data plane comprises a 3GPP data plane;
    establish, via the one or more network interfaces, a second data plane between the apparatus and the anchor device, wherein the second data plane comprises a PMIPv6 data plane; and
    perform a paging mobility management operation for the user equipment device under control of the MAG and the LMA without use of or control by an LTE Mobility Management Entity (MME) device or a 5G Access and Mobility Management Function (AMF) device, the paging mobility management operation comprising the LMA initiating paging of the user equipment device by sending a message from the LMA to the MAG and initiating a paging timer at the LMA.

15. The apparatus of claim 14, wherein:
the one or more processors are configured to implement an Evolved Node B or a Next Generation Node B; and
the first data plane is configured to provide data between the Evolved Node B or the Next Generation Node B and the user equipment device.

16. The apparatus of claim 14, wherein the one or more processors are configured to perform session management for the user equipment device without using the LTE MME device or a 5G Session Management Function (SMF) device.

17. The apparatus of claim 14, wherein the one or more processors are configured to establish the first data plane and establish the second data plane by mapping a General Packet Radio Service (GPRS) tunneling protocol (GTP) Tunnel Endpoint Identifier (TEID) of the first data plane to a Generic Routing Encapsulation (GRE) key of the second data plane.

18. The apparatus of claim 14, wherein the one or more processors are configured to perform a detach operation for the user equipment device comprising the MAG sending a deregistration message to the LMA.

19. The apparatus of claim 14, wherein the one or more processors are configured to perform a handover operation for the user equipment device comprising the MAG initiating the handover operation by sending a handover initiation message to the LMA.

20. The apparatus of claim 14, wherein the one or more processors are configured to provide Non-Access Stratum Signaling (NAS) termination at the apparatus.

* * * * *

UNITED STATES PATENT AND TRADEMARK OFFICE
CERTIFICATE OF CORRECTION

| | | |
|---|---|---|
| PATENT NO. | : 11,910,491 B2 | Page 1 of 1 |
| APPLICATION NO. | : 17/143625 | |
| DATED | : February 20, 2024 | |
| INVENTOR(S) | : Srinath Gundavelli et al. | |

It is certified that error appears in the above-identified patent and that said Letters Patent is hereby corrected as shown below:

In the Claims

Claim 3, Column 23, Line 61, please replace "using an LTE MME device or a 5G Session Management" with --using the LTE MME device or a 5G Session Management--

Signed and Sealed this
Fifteenth Day of October, 2024

Katherine Kelly Vidal
*Director of the United States Patent and Trademark Office*